(12) United States Patent
Amacker et al.

(10) Patent No.: US 10,814,494 B2
(45) Date of Patent: Oct. 27, 2020

(54) ROBOTIC GRIPPER FINGERS

(71) Applicant: Toyota Research Institute, Inc., Los Altos, CA (US)

(72) Inventors: Matthew Amacker, Santa Clara, CA (US); Arshan Poursohi, Berkeley, CA (US); Jonathan Yao, San Jose, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 118 days.

(21) Appl. No.: 15/887,072

(22) Filed: Feb. 2, 2018

(65) Prior Publication Data
US 2019/0091875 A1 Mar. 28, 2019

Related U.S. Application Data

(60) Provisional application No. 62/563,459, filed on Sep. 26, 2017.

(51) Int. Cl.
*B25J 13/08* (2006.01)
*B25J 15/08* (2006.01)
*B25J 9/16* (2006.01)

(52) U.S. Cl.
CPC ........... *B25J 13/089* (2013.01); *B25J 9/1612* (2013.01); *B25J 13/086* (2013.01); *B25J 13/087* (2013.01); *B25J 15/08* (2013.01)

(58) Field of Classification Search
USPC .................................................. 318/568.16
See application file for complete search history.

(56) References Cited

U.S. PATENT DOCUMENTS

| | | | |
|---|---|---|---|
| 4,980,626 A | 12/1990 | Hess et al. | |
| 7,221,120 B2 | 5/2007 | Tadano | |
| 7,420,155 B2 | 9/2008 | Mizota et al. | |
| 8,260,458 B2 * | 9/2012 | Kim | B25J 9/1612 294/213 |
| 8,499,651 B2 | 8/2013 | Kishida et al. | |
| 8,662,552 B2 | 3/2014 | Torres-Jara | |
| 8,897,918 B2 | 11/2014 | Goto et al. | |
| 2009/0285664 A1 * | 11/2009 | Kim | B25J 9/1612 414/730 |
| 2011/0137463 A1 * | 6/2011 | Alcazar | B25J 9/1669 700/259 |

(Continued)

OTHER PUBLICATIONS

Human-inspired robotic grasp control with tactile sensing http://wiki.ros.org/pr2_gripper_sensor_action?action=AttachFile&do=get&target=touch2.pdf Published/Access Date: Jun. 2011.

*Primary Examiner* — Jorge L Carrasquillo
(74) *Attorney, Agent, or Firm* — Dinsmore & Shohl LLP

(57) ABSTRACT

Robotic gripper fingers are disclosed. A gripper assembly includes a first finger defining a first object engagement face and a second finger defining a second object engagement face. The first object engagement face of the first finger opposes the second object engagement face of the second finger. The gripper assembly also includes at least one actuator in communication with the first finger that is configured to actuate the first finger relative to the second finger. The gripper assembly includes at least one first sensor facing outward from the first object engagement face. The at least one first sensor is configured to detect objects to be manipulated by actuating the first finger relative to the second finger.

18 Claims, 18 Drawing Sheets

(56) References Cited

U.S. PATENT DOCUMENTS

2012/0013139 A1* 1/2012 Torres-Jara ............ B25J 13/084
 294/110.1
2012/0086018 A1* 4/2012 Yao ....................... G01S 7/4813
 257/82
2013/0325181 A1* 12/2013 Moore ..................... B25J 13/08
 700/259

* cited by examiner

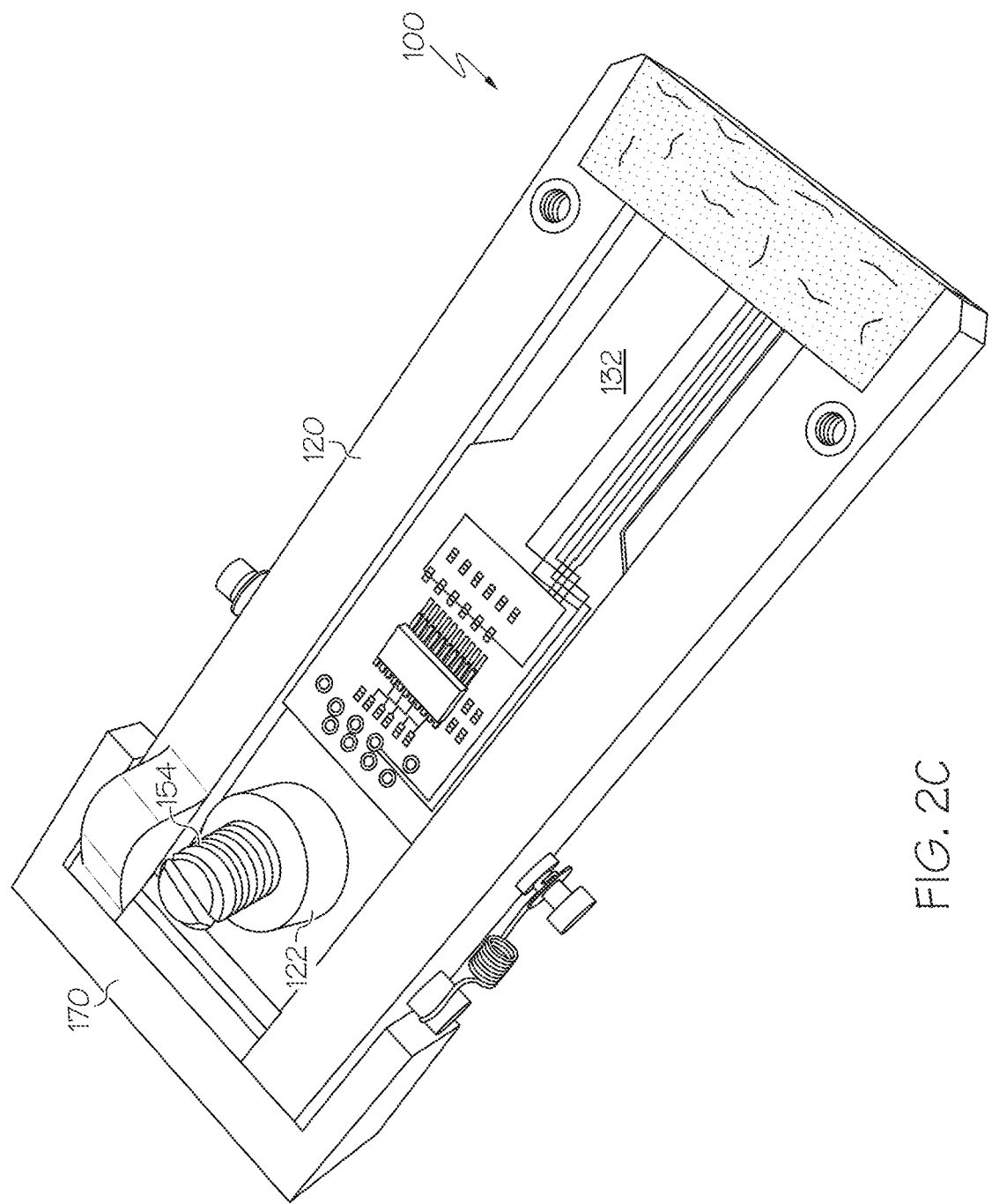

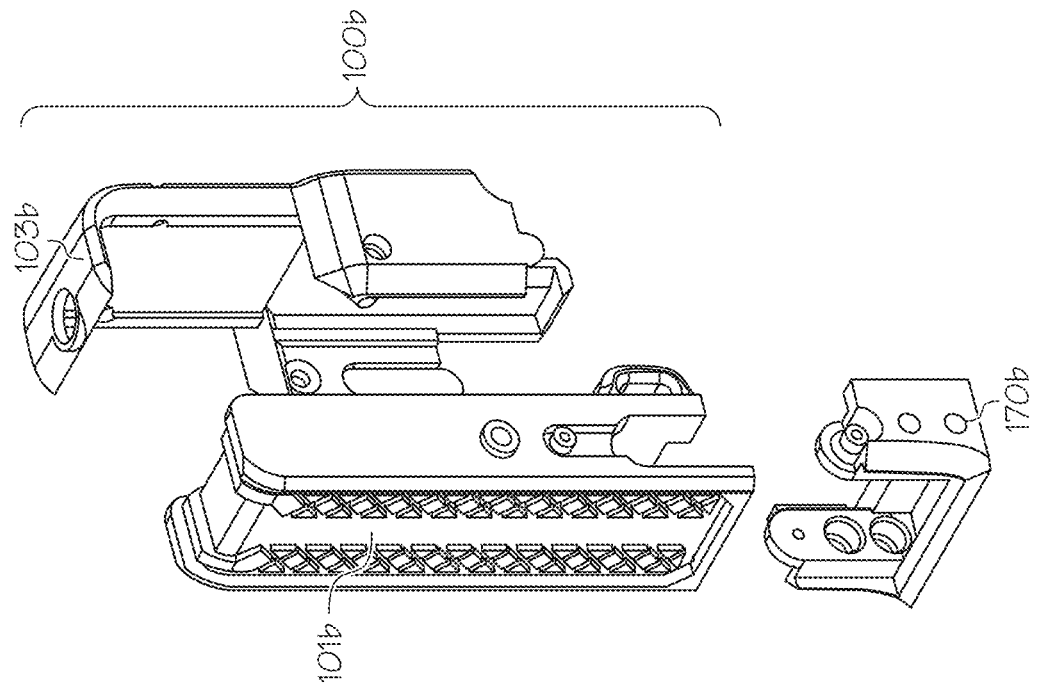
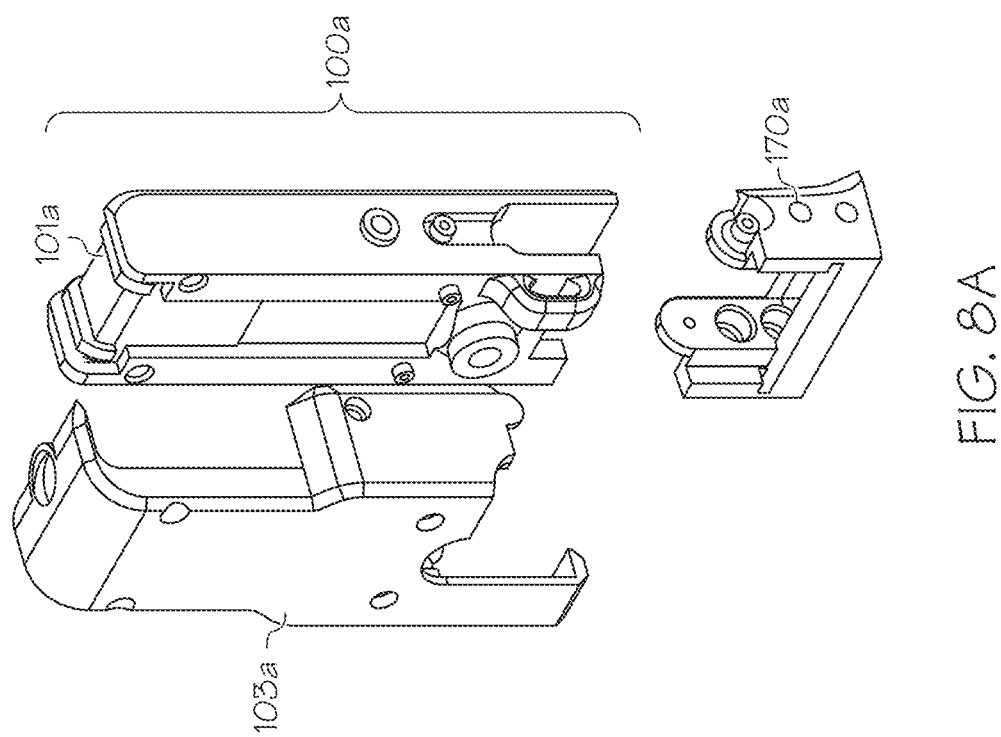

ROBOTIC GRIPPER FINGERS

CROSS-REFERENCE TO RELATED APPLICATIONS

This application claims the benefit of U.S. Provisional Application 62/563,459, filed Sep. 26, 2017, which is incorporated by reference in its entirety.

TECHNICAL FIELD

The present disclosure generally relates to robotic gripper fingers and, more particularly, to a gripper assembly including a first finger that is moveable with respect to a second finger and at least one sensor configured to detect objects to be manipulated by the gripper assembly. Embodiments also relate to a finger that is coupled to a retention bracket by a biasing member.

BACKGROUND

Robots may utilize end effectors, such as grippers comprising fingers, to grasp and manipulate objects in an operating environment. The grippers may be used for carrying, assembling, or otherwise handling a variety of objects in an operating environment. For instance, robots utilizing end effectors may be used in processes such as painting, welding, assembling, and the like. The grippers of a robot are required to grasp an object firmly without crushing or otherwise deforming the object. Robots may rely upon any number of approaches to manipulate the end effectors. For example, some conventional robots may require a human operator to observe and control the end effectors. Alternatively, sensors such as cameras may be used to capture images representing the end effectors of a robot. The robot includes one or more computers to determine an appropriate force and position to grasp the object based on analyzing the images captured by the cameras.

SUMMARY

In one embodiment, a gripper assembly includes a first finger defining a first object engagement face and a second finger defining a second object engagement face. The first object engagement face of the first finger opposes the second object engagement face of the second finger. The gripper assembly also includes at least one actuator in communication with the first finger that is configured to actuate the first finger relative to the second finger. The gripper assembly includes at least one first sensor facing outward from the first object engagement face of the first finger. The at least one first sensor is configured to detect objects to be manipulated by actuating the first finger relative to the second finger.

In another embodiment, a gripper assembly includes at least one finger, a retention bracket, at least one biasing member coupled to the at least one finger and the retention bracket, and a sensor. The at least one finger is biased to be in engagement with the retention bracket and is moveable in a direction away from the retention bracket when the at least one finger is pulled in the direction away from the retention bracket. The sensor is configured to output a signal indicative of a position of the at least one finger relative to the retention bracket.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2C depicts a rear view of a finger of a robotic gripper including a wiper retained in a wiper retention recess, according to one or more embodiments shown and described herein;

FIG. 8A depicts a perspective exploded view of a finger, according to one or more embodiments shown and described herein;

FIG. 8B depicts a perspective view of a finger that opposes the finger shown in FIG. 8A, according to one or more embodiments shown and described herein;

DETAILED DESCRIPTION

Embodiments of the present disclosure are directed to robotic gripper fingers. More specifically, the disclosure is directed towards a gripper assembly including a first finger and a second finger that opposes the first finger. The first finger defines a first object engagement face and the second finger defines a second object engagement face, where the first object engagement face opposes the second object engagement face. The first finger may be actuated relative to the second finger to grasp objects between the two fingers.

In one embodiment, the first finger includes at least one sensor facing outward from the first object engagement face, where the sensor is configured to detect the objects manipulated by actuating the first finger relative to the second finger. Specifically, the first finger may include one or more near range sensors and/or one or more far range sensors for detecting objects grasped by the gripper assembly. In an embodiment of the present disclosure, the fingers may include a covering material. The covering material may be substantially transparent and disposed over the sensor, and facilitates the gripping of an object and also protects the sensor.

In another embodiment of the disclosure, a robot determines a position of a finger relative to a retention bracket. More specifically, the robot may determine that the finger has been pulled based on a signal output generated by a sensor such as a potentiometer. In response to determining that the finger has been pulled, the robot may release an object that is grasped by the finger that was pulled. Although releasing an object is described, it should be appreciated that the disclosure is not limited to the robot releasing an object. For example, the robot may output a tactile sensation or light in response to determining the finger is pulled. In one embodiment of the present disclosure, the gripper assembly includes at least one finger, a retention bracket, at least one biasing member coupled to the at least one finger and the retention bracket, and a sensor. The finger is biased to be in engagement with the retention bracket and is moveable in a direction away from the retention bracket when the finger is pulled in the direction away from the retention bracket. The sensor is configured to output a signal indicative of a position of the finger relative to the retention bracket.

Figure 1A:
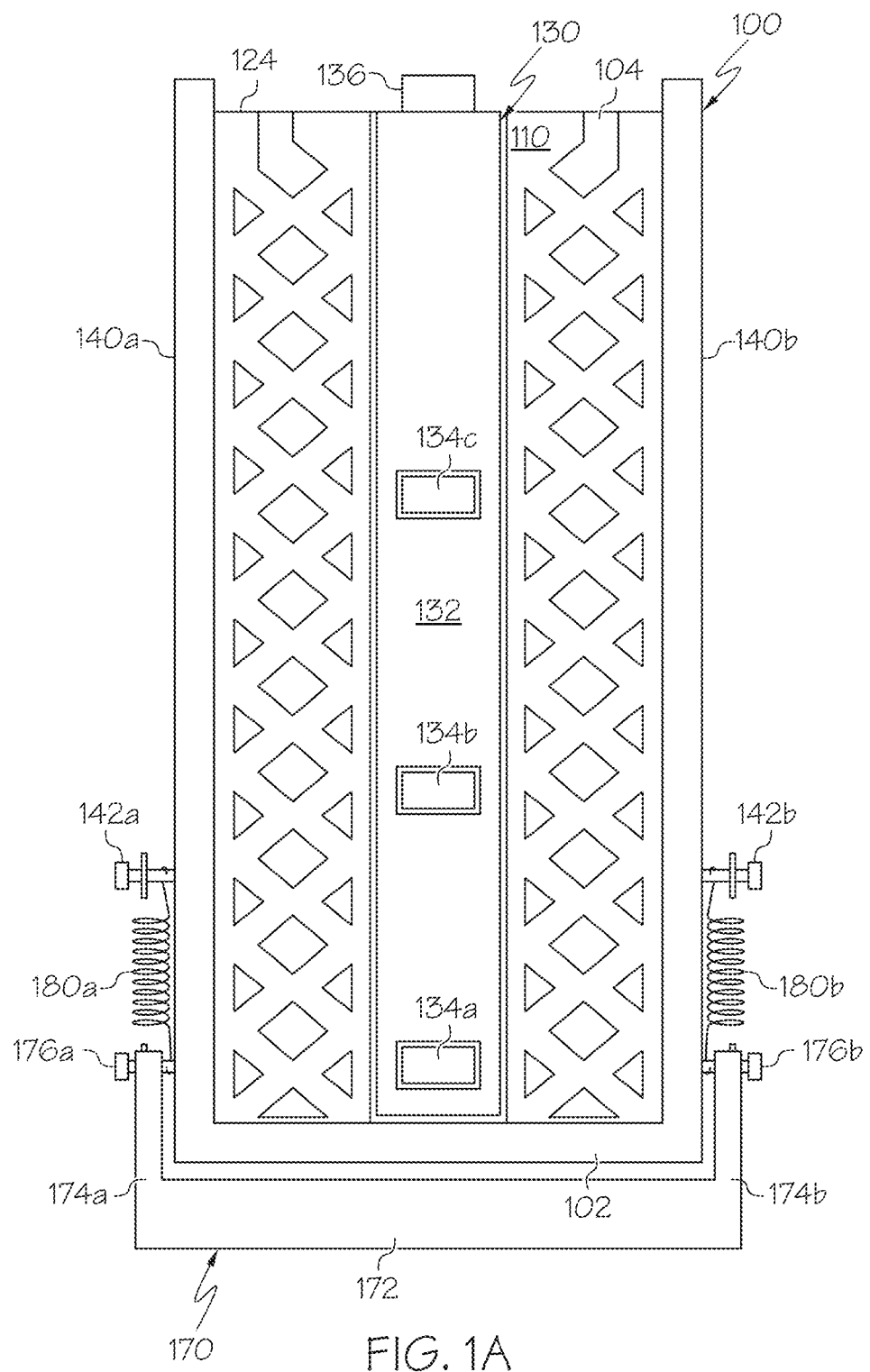
FIG. 1A schematically depicts a front view of a finger of a robotic gripper, according to one or more embodiments shown and described herein.
Figure 1B:
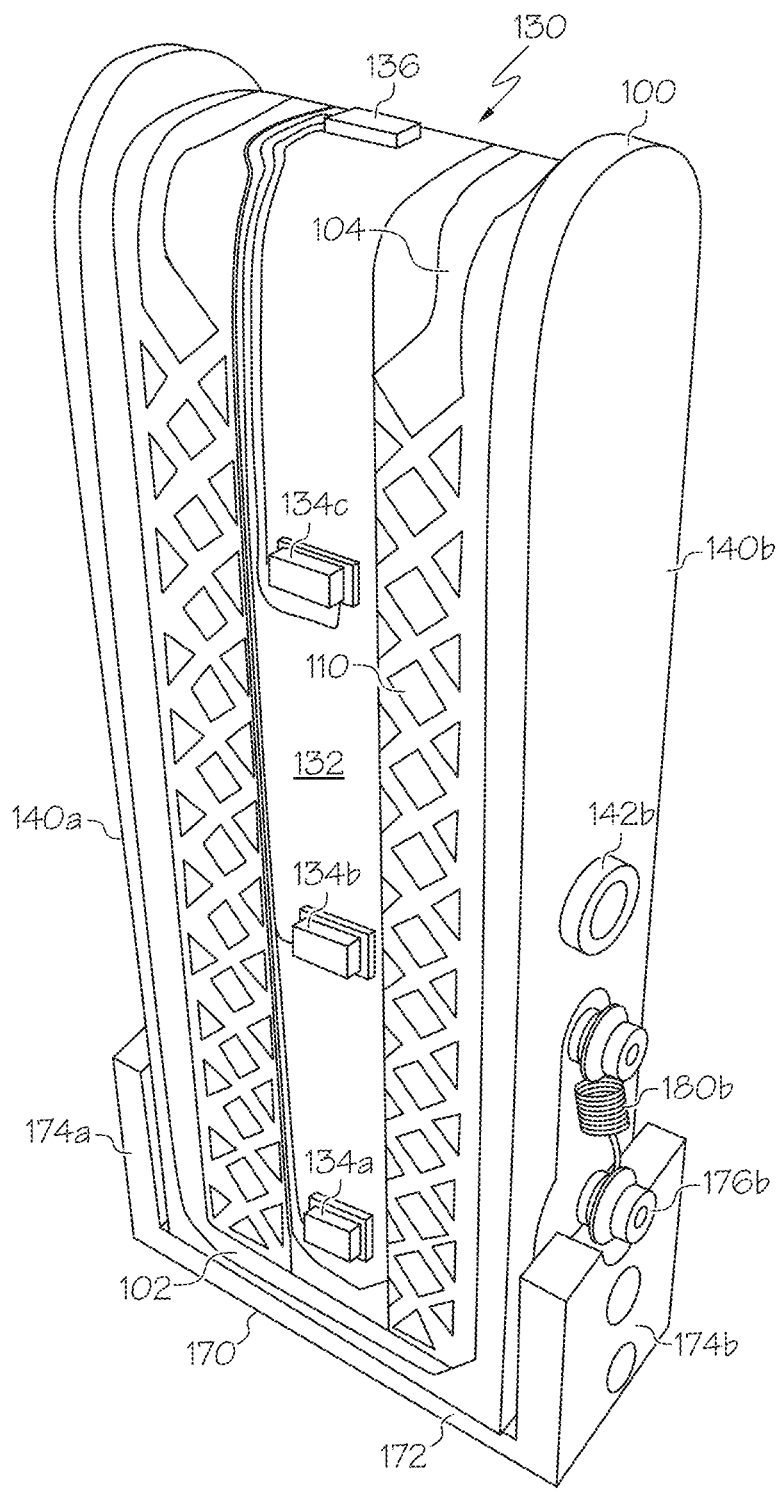
FIG. 1B depicts a perspective view of a finger of a robotic gripper, according to one or more embodiments shown and described herein.
Figure 6:
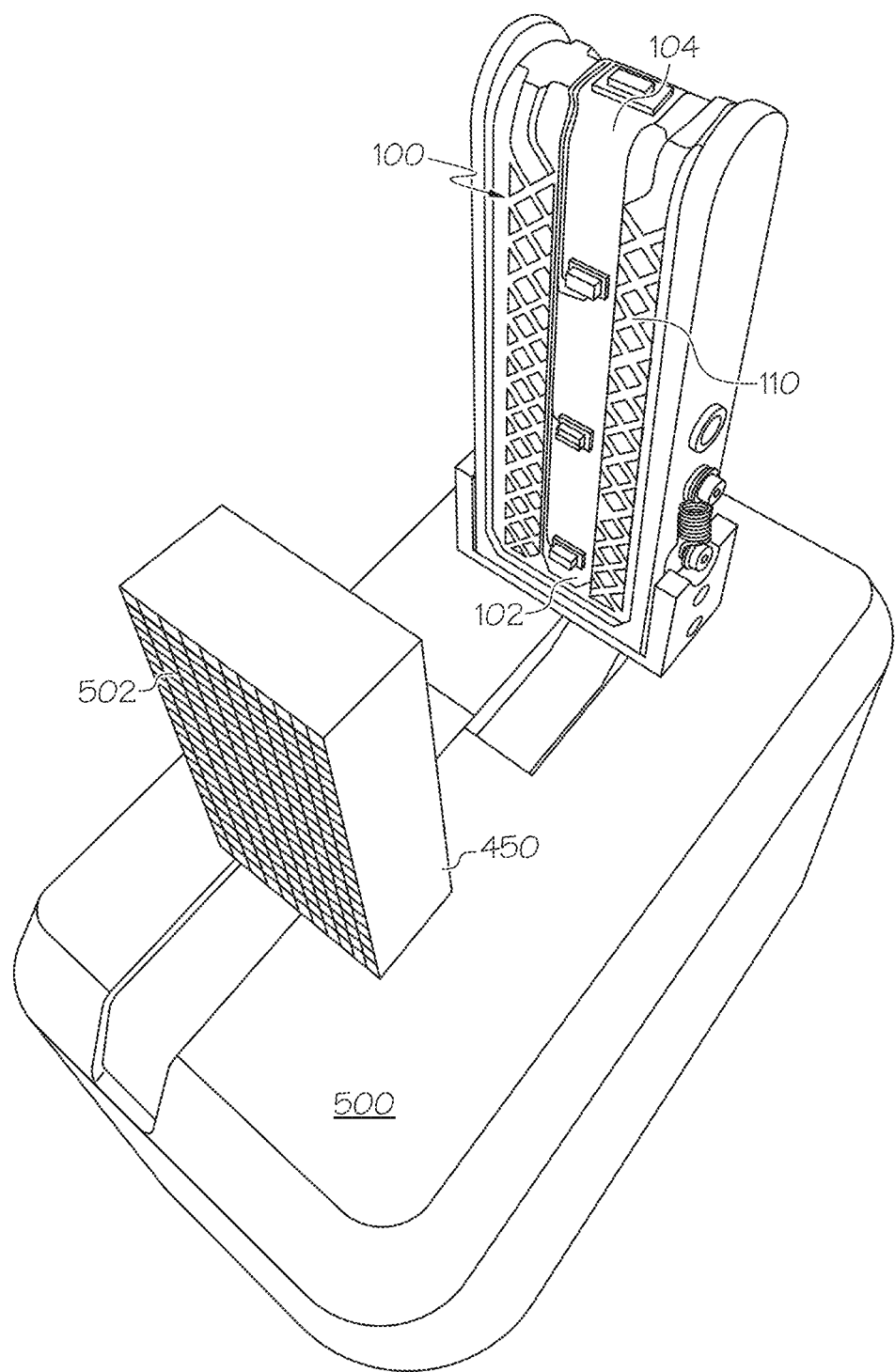
FIG. 6 depicts opposing fingers of a gripper assembly coupled to a robotic arm, according to one or more embodiments shown and described herein.
Figure 7A:
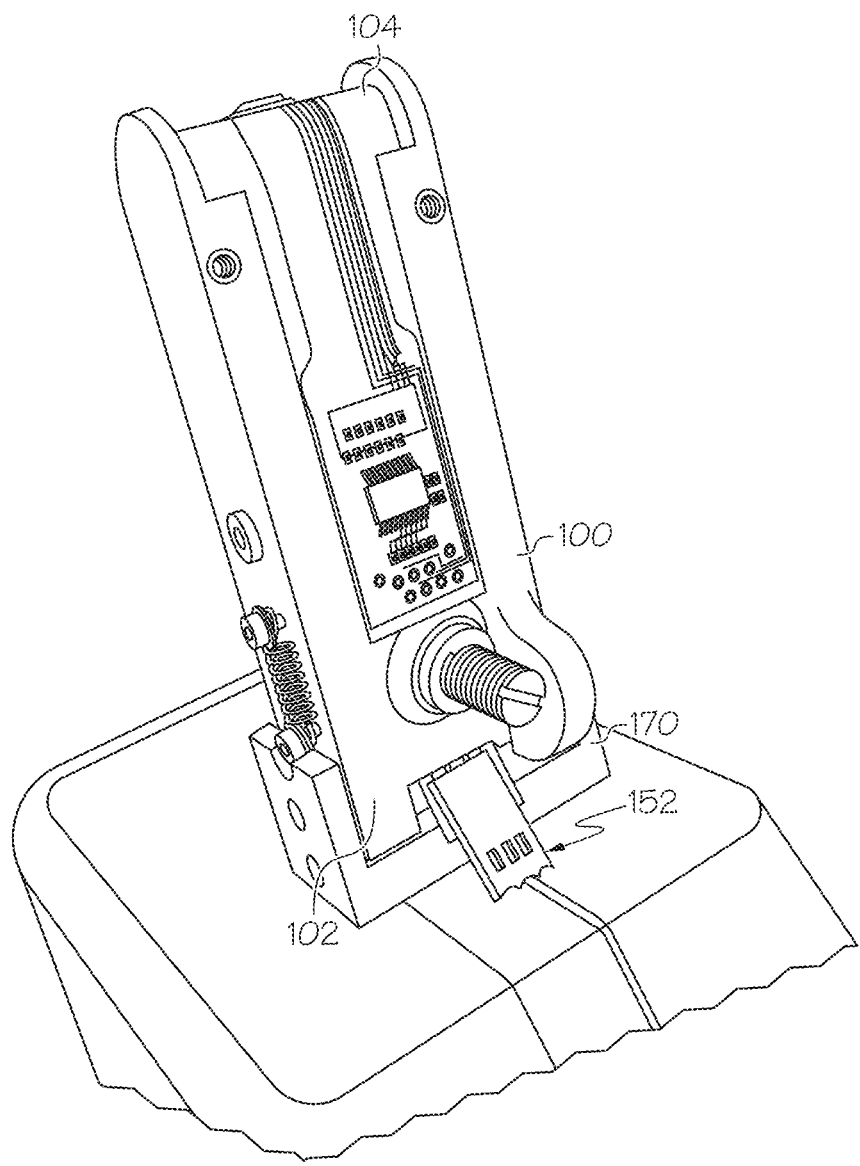
FIG. 7A depicts a finger of a robotic gripper in a retracted position, according to one or more embodiments shown and described herein.
Figure 7B:
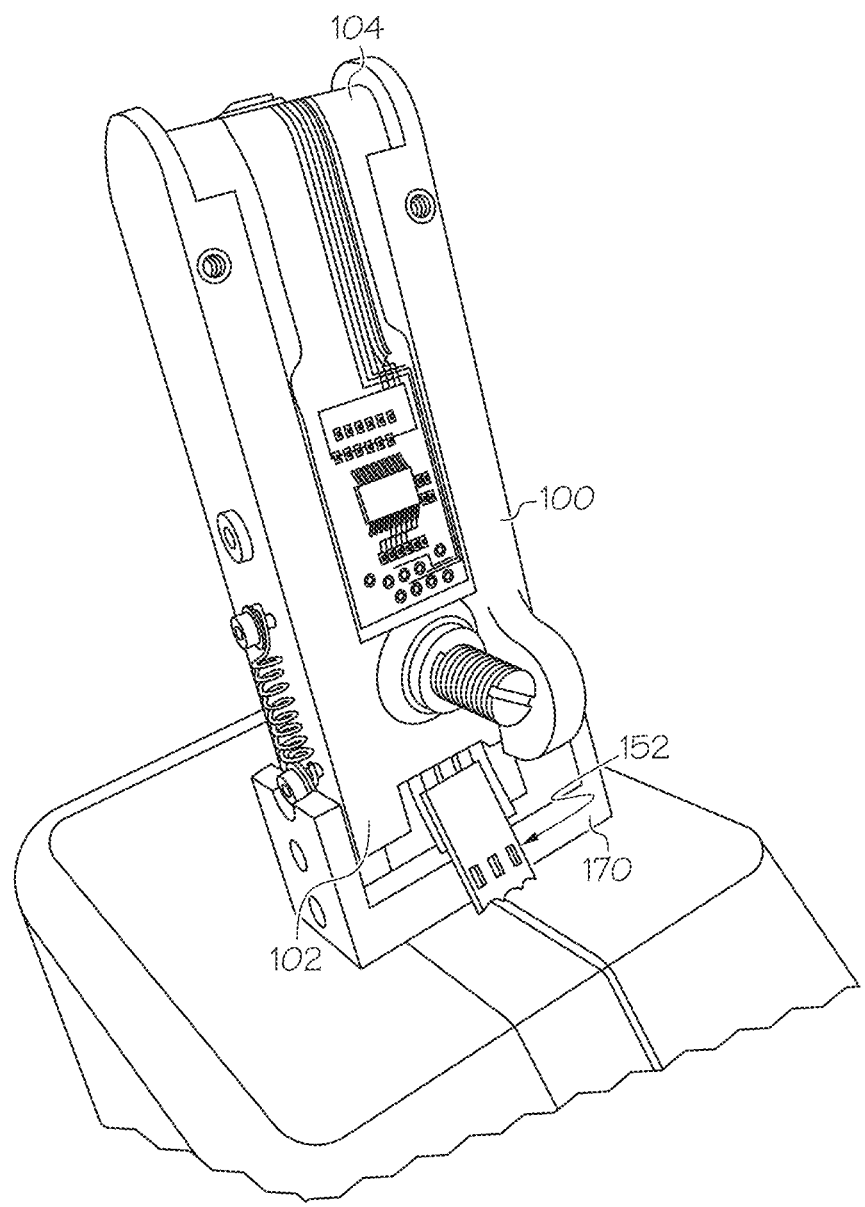
FIG. 7B depicts a finger of a robotic gripper in an extended position, according to one or more embodiments shown and described herein.

Referring initially to FIGS. 1A-1B, a finger 100 and a finger retention bracket 170 for use as a part of a gripper assembly of a robot (e.g., the gripper assembly coupled to a robotic arm, as shown in FIG. 6) is schematically depicted. The finger retention bracket 170 is configured to retain the finger 100 and be coupled to a robotic arm such that the finger 100 is coupled to the robotic arm, as shown in FIG. 6. Referring to FIGS. 1A-1B, the finger retention bracket 170 comprises a bottom portion 172, a first side portion 174a, and a second side portion 174b. The bottom portion 172 extends between the first side portion 174a and the second side portion 174b. The first side portion 174a includes a first spring engagement portion 176a configured to engage with and retain a first biasing member or spring 180a that couples the finger 100 to the finger retention bracket 170 such that the finger 100 is biased to be in engagement with the finger retention bracket 170 (e.g., as shown in FIG. 7A) but is movable away from the finger retention bracket 170 when the finger 100 is pulled in a direction away from the finger retention bracket 170 (e.g., as shown in FIG. 7B). Referring to FIGS. 1A-1B, the second side portion 174b includes a second spring engagement portion 176b configured to engage with and retain a second spring 180b that couples the finger 100 to the finger retention bracket 170 such that the finger 100 is biased to be in engagement with the finger retention bracket 170 (e.g., as shown in FIG. 7A) but is movable away from the finger retention bracket 170 when the finger 100 is pulled in a direction away from the finger retention bracket 170 (e.g., as shown in FIG. 7B).

Still referring to FIGS. 1A-1B, the finger 100 comprises a proximal end 102 and a distal end 104. When the finger 100 is installed on a robotic arm as part of a gripper assembly (e.g., as shown in FIGS. 6, 7A, and 7B), the proximal end 102 is closer to the robotic arm than the distal end 104. Referring to FIGS. 1A-1B, the finger 100 further comprises an object engagement face 110 configured to face toward an object to be engaged by the finger 100, a sensor assembly 130, a first side 140a, and a second side 140b.

Still referring to FIGS. 1A-1B, the sensor assembly 130 comprises a flexible printed circuit board 132, a first near range sensor 134a, a second near range sensor 134b, a third near range sensor 134c, and a long range sensor 136. The flexible printed circuit board 132 extends along a central channel of the object engagement face 110 from the proximal end 102 to the distal end 104 of the finger 100, extends along a central channel of a top of the finger 100 (See FIG. 3A) and extends along a central channel of a back side 120 of the finger 100 (See FIGS. 2A-2C). In some embodiments, the flexible printed circuit board 132 is positioned differently, such as embodiments in which the flexible printed circuit board 132 is offset from the center of the object engagement face 110, and embodiments in which the flexible printed circuit board 132 does not extend along all three of the object engagement face 110, the top of the finger 100, and the back side 120 of the finger 100.

Referring once again to FIGS. 1A-1B, each of the first near range sensor 134a, the second near range sensor 134b, and the third near range sensor 134c are configured to detect objects at near range or depth (e.g., about 1-3 cm from the sensor in some embodiments). In some embodiments, the first near range sensor 134a, the second near range sensor 134b, and the third near range sensor 134c are configured to detect objects at the same depth, while in other embodiments, at least one of the first near range sensor 134a, the second near range sensor 134b, and the third near range sensor 134c is configured to detect objects at a different depth than at least one other sensor of the first near range sensor 134a, the second near range sensor 134b, and the third near range sensor 134c. In one embodiment, the first near range sensor 134a is configured to detect objects at a first depth and at least one remaining sensor (i.e., either or both the second near range sensor 134b and the third near range sensor 134c) is configured to detect objects at a second depth, where the first depth measured by the first near range sensor 134a is either greater or less than the second depth measured by either or both the second near range sensor 134b and the third near range sensor 134c.

The first near range sensor 134a, the second near range sensor 134b, and the third near range sensor 134c are disposed on the flexible printed circuit board 132 facing outward from the object engagement face 110 at positions of increasing distance from the bottom portion 172 of the finger retention bracket 170 such that the first near range sensor 134a is a first distance from the bottom portion 172, the second near range sensor 134b is a second distance (larger than the first distance) from the bottom portion 172 and the third near range sensor 134b is a third distance (larger than the second distance) from the bottom portion 172. In some embodiments, one or more of the first near range sensor 134a, the second near range sensor 134b, and the third near range sensor 134c is oriented to face orthogonal to the object engagement face 110 (e.g., to facilitate the detection of objects to be grasped with the finger 100), while in other embodiments, one or more of the first near range sensor 134a, the second near range sensor 134b, and the third near range sensor 134c is configured to face non-orthogonal to the object engagement face 110 (e.g., to enhance the ability to distinguish between the presence of an opposing finger proximate the object engagement face 110 and an object disposed between the finger 100 and an opposing finger used to grip an object). In some embodiments, one or more of the first near range sensor 134a, the second near range sensor 134b, and the third near range sensor 134c may not be disposed on the flexible printed circuit board 132 such as embodiments in which one or more of the first near range sensor 134a, the second near range sensor 134b, and the third near range sensor 134c are integrally formed in the object engagement face 110, or the like.

Still referring to the sensor assembly 130 of FIGS. 1A-1B, in some embodiments, the distance between the first near range sensor 134a and the second near range sensor 134b and the distance between the second near range sensor 134b and the third near range sensor 134c is substantially the same such that the first near range sensor 134a, the second near range sensor 134b, and the third near range sensor 134c are equally spaced. In other embodiments, the distance between the first near range sensor 134a and the second near range sensor 134b is greater than or smaller than the distance between the second near range sensor 134b and the third near range sensor 134c such that the spacing between the first near range sensor 134a, the second near range sensor 134b, and the third near range sensor 134c is irregular. While the embodiment depicted in FIGS. 1A-1B includes three near range sensors, other embodiments may include more than three near range sensors or less than three near range sensors.

Still referring to FIGS. 1A-1B, in some embodiments, each of the first near range sensor 134a, the second near range sensor 134b, and the third near range sensor 134c comprises an infrared emitter and an infrared detector. In some embodiments, one or more of the first near range sensor 134a, the second near range sensor 134b, and the third near range sensor 134c may comprise an infrared camera, a visible light camera, an ultraviolet camera, an ultrasonic transducer, a radar, a LIDAR, or any other sensor capable of detecting or otherwise sensing an object. In some embodiments, the first near range sensor 134a, the second near range sensor 134b, and the third near range sensor 134c comprise substantially the same sensing components. In some embodiments, one or more of the first near range sensor 134a, the second near range sensor 134b, and the third near range sensor 134c may include sensing components different from one another.

Referring to FIGS. 1A, 1B, 2A, and 2B, the long range sensor 136 is disposed at the distal end 104 of the finger 100. More specifically, in the embodiment as shown in the figures, the long range sensor 136 is disposed at the top of the finger 100. The long range sensor 136 is configured to detect objects at long range or depth (e.g., at a range or depth longer than the range or depth one or more of the near range sensors are configured to sense, such as greater than about 1-3 cm from the sensor in some embodiments). In some embodiments, the long range sensor 136 comprises a time of flight sensor. In some embodiments, the long range sensor 136 comprises a laser light emitter and a corresponding sensor for detecting how long it takes for laser light emitted by the laser light emitter to be detected by the sensor. In some embodiments, the long range sensor may comprise a camera, an ultrasonic transducer, a radar, a LIDAR, or the like. In some embodiments, the long range sensor 136 may include other components. In some embodiments, the finger 100 may include more than one long range sensor 136. In some embodiments, the long range sensor 136 may be positioned in a different location than shown in the figures.

Referring to FIG. 1A, the first side 140a includes a first spring engagement portion 142a configured to engage with and retain a first spring 180a that couples the finger 100 to the first spring engagement portion 176a of the first side portion 174a of the finger retention bracket 170 such that the finger 100 is biased to be in engagement with the finger retention bracket 170 but is movable away from the finger retention bracket 170 when the finger 100 is pulled in a direction away from the finger retention bracket 170. The second side 140b includes a second spring engagement portion 142b configured to engage with and retain a second spring 180b that couples the finger 100 to the second spring engagement portion 176b of the second side portion 174b of the finger retention bracket 170 such that the finger 100 is biased to be in engagement with the finger retention bracket 170 but is movable away from the finger retention bracket 170 when the finger 100 is pulled in a direction away from the finger retention bracket 170. In some embodiments, the finger retention bracket 170 may be coupled to the finger 100 in a different manner, such as via a biasing member other than a spring or in a configuration in which the finger 100 is movable relative to the finger retention bracket 170 but is not biased relative to the finger retention bracket 170.

Figure 2A:
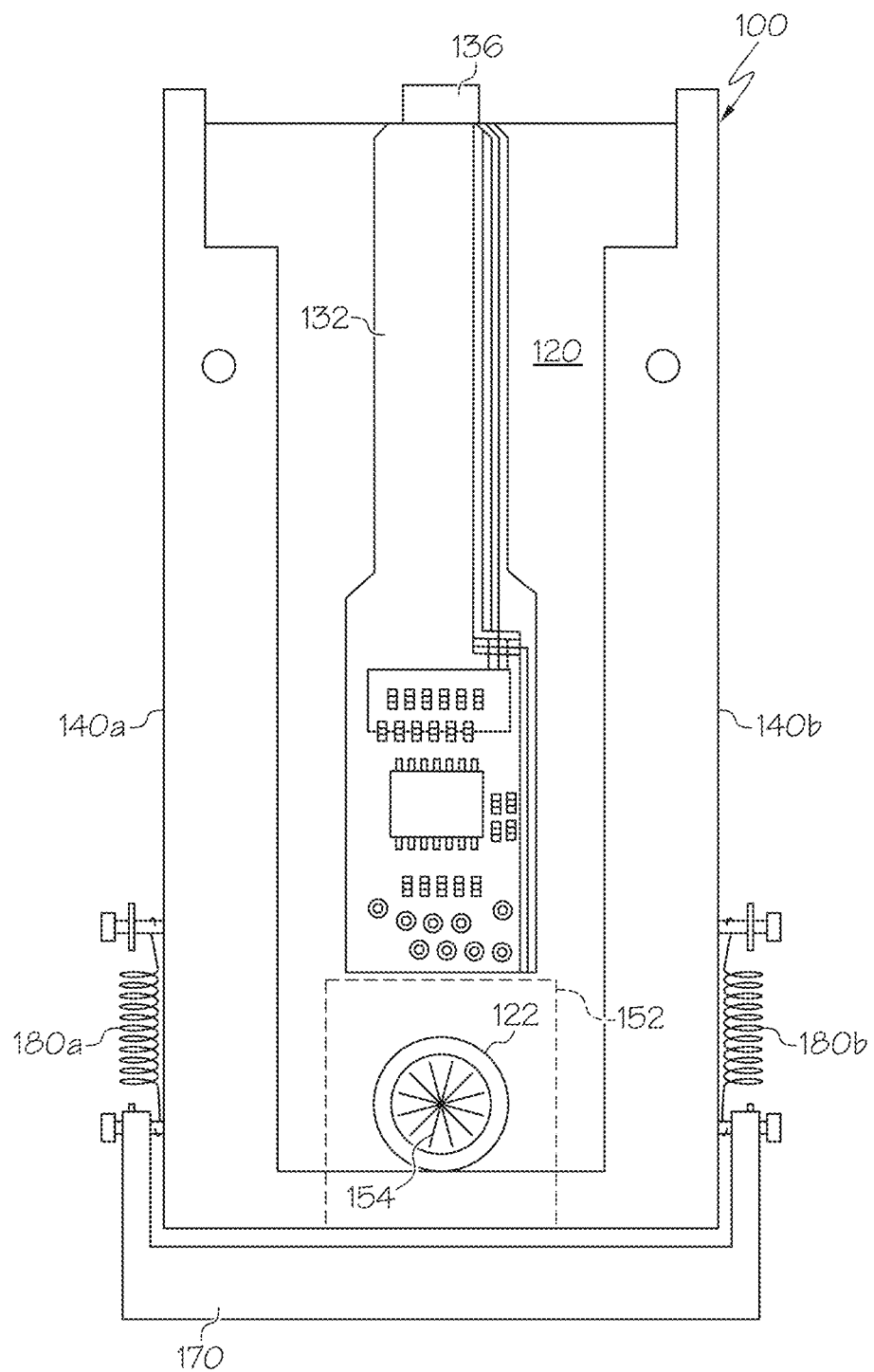
FIG. 2A schematically depicts a rear view of a finger of a robotic gripper, according to one or more embodiments shown and described herein.
Figure 2B:
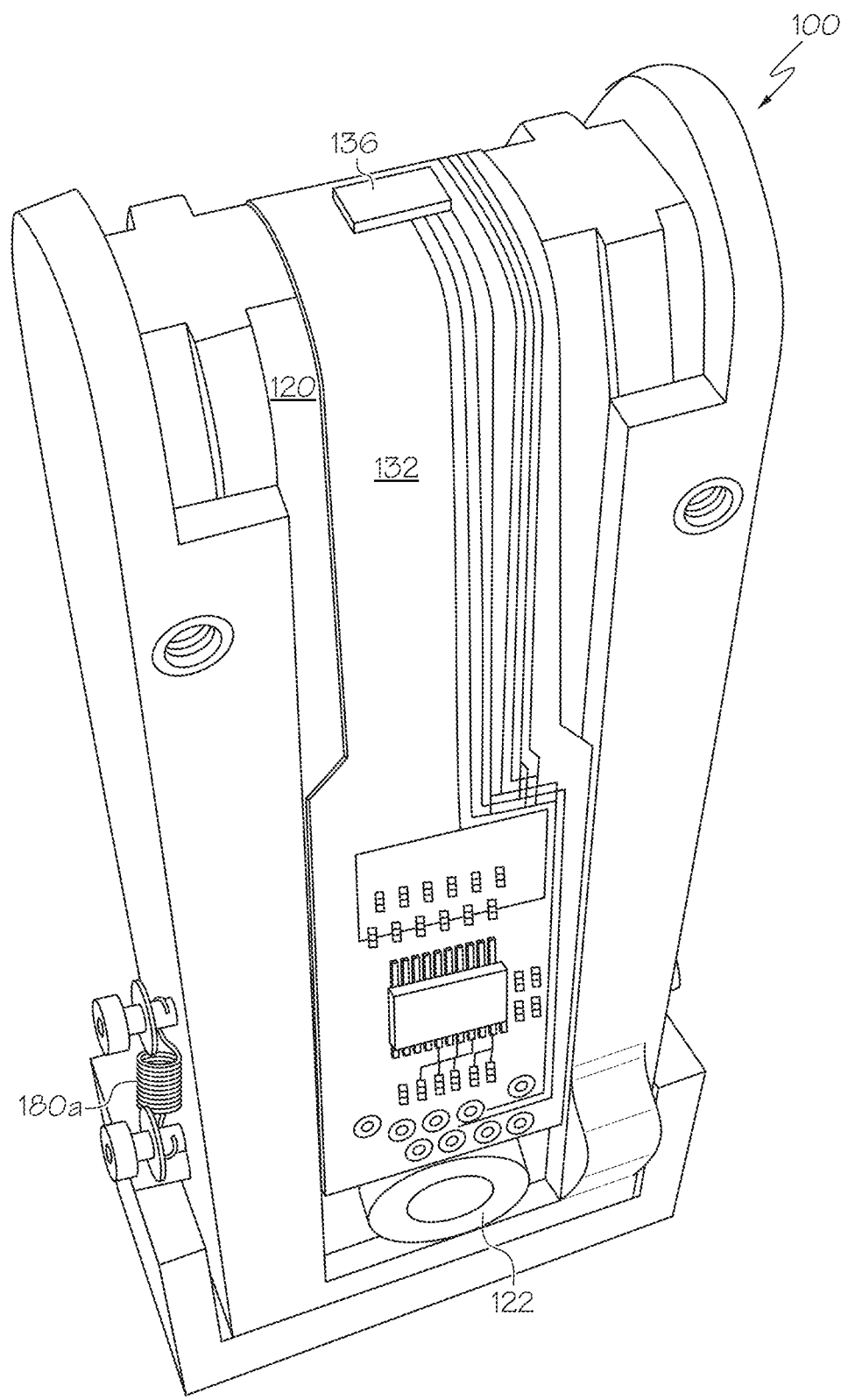
FIG. 2B depicts a rear view of a finger of a robotic gripper, according to one or more embodiments shown and described herein.

Referring now to FIGS. 2A-2C, a rear view of the finger 100 is depicted. The finger 100 includes a back face 120 comprising a wiper retention recess 122 for retaining a wiper 154. As the finger 100 is pulled away from the finger retention bracket 170 (e.g., as shown in FIG. 7B), the wiper 154 moves relative to a potentiometer 152 (shown in both FIGS. 7A and 7B), the position of which stays fixed as the finger 100 moves relative to the finger retention bracket 170 (e.g., when the potentiometer 152 is coupled to the finger retention bracket 170, is coupled to the robotic arm, or the like), and which is configured to output a signal, the value of which is dependent on the position of the wiper 154 relative to the potentiometer 152. In some embodiments, the position of the finger 100 and/or whether the finger 100 is pulled away from the finger retention bracket 170 is determined in another manner, such as based on an output signal from a camera, based on an output signal from a LVDT, or the like. In some embodiments, the wiper 154 is metallic.

Figure 3A:
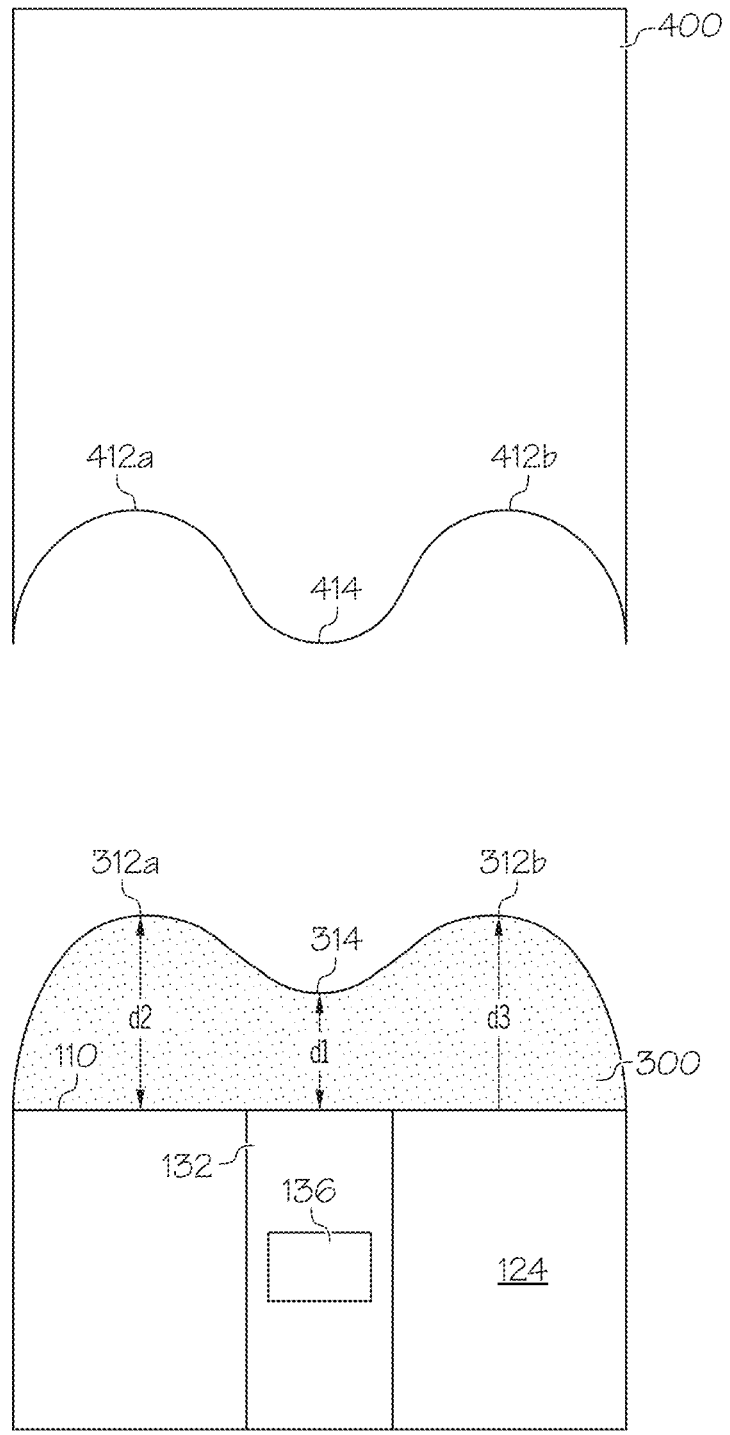
FIG. 3A schematically depicts a top view of a finger of a robotic gripper and a scraper, according to one or more embodiments shown and described herein.

A finger comprising a covering material 300 will now be described with reference to FIGS. 3A-3D. Referring now to FIG. 3A, a top view of the finger 100 and a scraper 400 is schematically depicted. The finger 100 includes a top 124 to which the long range sensor 136 is coupled. The long range sensor 136 is positioned in a central location of the top 124, though in other embodiments the long range sensor 136 is positioned off-center on the top 124 or at a location other than at the top 124 (e.g., such as when the long range sensor 136 is positioned on the object engagement face and faces away from the object engagement face).

Figure 3B:
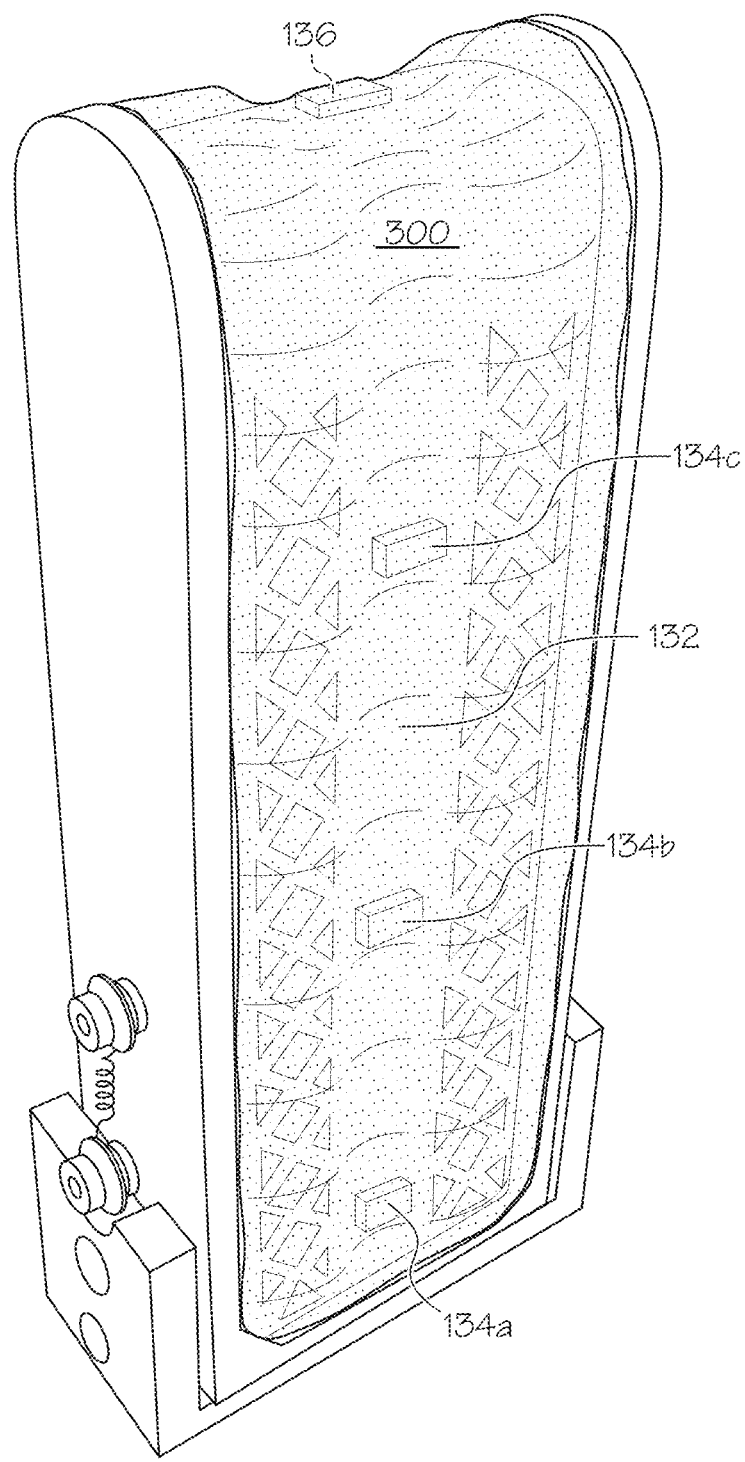
FIG. 3B depicts a perspective view of a finger of a robotic gripper covered in a covering material, according to one or more embodiments shown and described herein.
Figure 3C:
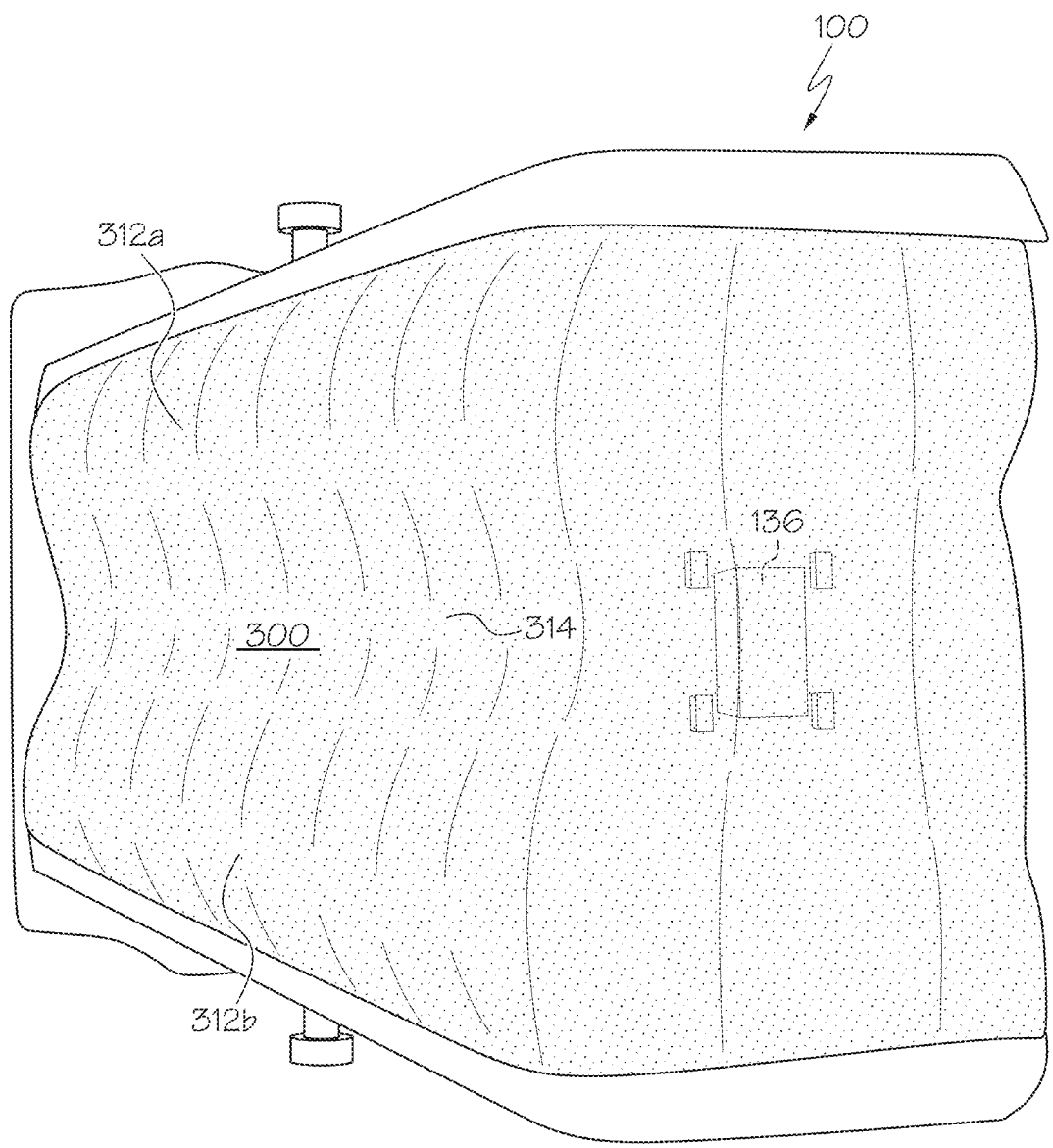
FIG. 3C depicts a top view of a finger of a robotic gripper, according to one or more embodiments shown and described herein.

Referring to FIG. 3A (top view), FIG. 3B (perspective view showing object engagement face), and FIG. 3C (top perspective view), a covering material 300 is disposed over the object engagement face 110 such that the covering material 300 covers at least a portion of the sensor assembly 130 disposed on the object engagement face 110. By providing a covering material 300, issues associated with the sensors on the object engagement face 110 being in direct contact with an object to be manipulated may be mitigated.

Referring to FIGS. 3A-3C, the covering material 300 has a profile such that the covering material 300 includes a first ridge 312a and a second ridge 312b positioned on opposite sides of a cavity 314 such that a thickness d2 of the covering material 300 at the first ridge 312a is greater than a thickness d1 of the covering material 300 at the cavity 314 and a thickness d3 of the covering material 300 at the second ridge 312b is greater than the thickness d1 of the covering material 300 at the cavity 314. In some embodiments, the thickness d1 and the thickness d2 are substantially the same such that the first ridge 312a and the second ridge 312b extend from the object engagement face 110 substantially the same amount. In other embodiments, the thickness d1 and the thickness d2 are different. The covering material 300 including the first ridge 312a, the cavity 314, and the second ridge 312b may simultaneously protect the sensors 134a, 134b, 134c, 136 of the sensor assembly 130 covered by the covering material 300 and facilitate gripping, moving, and/or manipulation of an object with the first ridge 312a and the second ridge 312b, which provide desirable points of contact with the object. The profile of the covering material 300 shown in the figures includes a cavity extending down the center of the gripper with enough substrate on both sides, thereby keeping the object from direct contact with edges of the object engagement face 110 while allowing the sensors covered by the covering material 300 to remain effective. In some embodiments, the covering material 300 has a profile other than what is depicted in the figures, such as embodiments in which the covering material 300 has more than one ridge, embodiments in which the covering material 300 is of substantially the same thickness across its cross-section, or the like.

In some embodiments, the covering material 300 is water clear silicone sealant (e.g., Cat. No. WCS5 water clear silicone sealant available from CR Laurence, Inc.), which may be substantially transparent, thereby allowing the sensors covered by the covering material 300 to operate appropriately, as well as of an appropriate texture to effectively grip an object. In some embodiments, the covering material 300 may be formed from a material other than silicone, such as when the covering material 300 is formed from a different substantially transparent or translucent substance and/or when the covering material 300 is formed from a different material having a texture desirable for gripping and manipulating objects. Some embodiments may not include the covering material 300, such as embodiments in which any sensors positioned on the object engagement face 110 are integrally formed in the object engagement face 110, or the like.

Figure 3D:
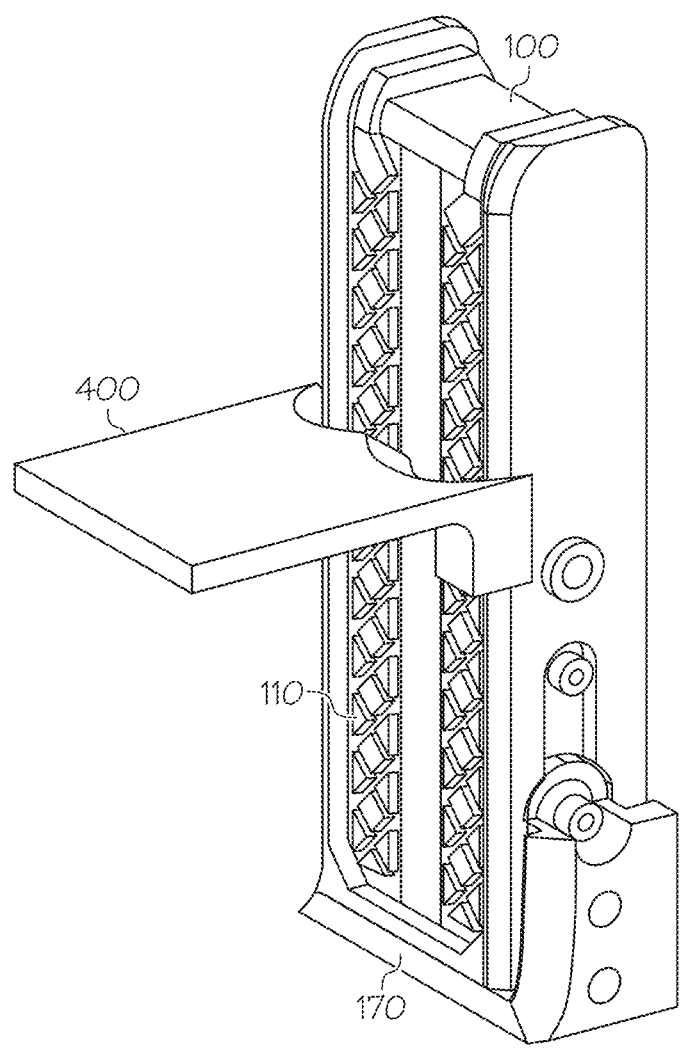
FIG. 3D depicts a perspective view of a finger of a robotic gripper and a scraper, according to one or more embodiments shown and described herein.

FIG. 3A also depicts a scraper 400 having a profile complimentary to that of the covering material 300. In particular, the scraper 400 includes a ridge 414 disposed between a first cavity 412a and a second cavity 412b. To form the covering material 300 having the profile depicted in FIG. 3A, a thick coat of silicone may be applied to the object engagement face 110 and the scraper 400 may be pressed into the object engagement face 110 and dragged along the object engagement face 110 to scrape away excess covering material to leave the covering material 300 having the profile shown in FIGS. 3A-3C. FIG. 3D depicts a perspective view of the scraper 400 and the object engagement face 110, where the covering material 300 has been omitted. In order to form the covering material 300 to have the profile shown in the figures, the scraper 400 of FIG. 3D would be translated up and down the object engagement face 110. The scraper 400 may be formed from a plastic material, a metallic material, a composite material, or any other material effective to form the covering material 300 into the appropriate profile.

Figure 4:
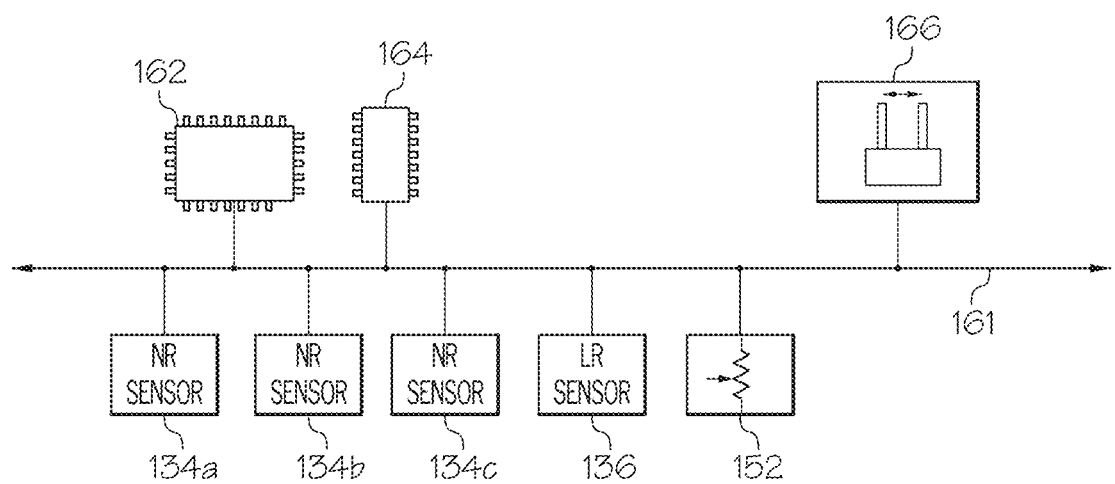
FIG. 4 schematically depicts components of a robot according to one or more embodiments shown and described herein.

Referring now to FIG. 4, the interconnection of various components of a robot are schematically depicted. FIG. 4 shows the first near range sensor 134a, the second near range sensor 134b, the third near range sensor 134c, the long range sensor 136, the potentiometer 152, a processor 162, a memory module 164, and actuator drive hardware 166 all communicatively coupled via a communication path 161.

Still referring to FIG. 4, the communication path 161 may be formed from any medium that is capable of transmitting a signal such as, for example, conductive wires, conductive traces, optical waveguides, or the like. Moreover, the communication path 161 may be formed from a combination of mediums capable of transmitting signals. In one embodiment, the communication path 161 comprises a combination of conductive traces, conductive wires, connectors, and buses that cooperate to permit the transmission of electrical data signals to components such as processors, memories, sensors, input devices, output devices, and communication devices. Accordingly, the communication path 161 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 161 communicatively couples the various components of the robot. As used herein, the term "communicatively coupled" means that coupled components are capable of exchanging data signals with one another such as, for example, electrical signals via conductive medium, electromagnetic signals via air, optical signals via optical waveguides, and the like.

The processor 162 may be any device capable of executing machine-readable instructions. Accordingly, the processor 162 may be a controller, an integrated circuit, a microchip, a computer, or any other computing device. The processor 162 is communicatively coupled to the other components of the robot by the communication path 161. Accordingly, the communication path 161 may communicatively couple any number of processors with one another, and allow the components coupled to the communication path 161 to operate in a distributed computing environment. Specifically, each of the components may operate as a node that may send and/or receive data. While the embodiment depicted in FIG. 4 includes a single processor 162, other embodiments may include more than one processor.

Still referring to FIG. 4, the memory module 164 is coupled to the communication path 161 and communicatively coupled to the processor 162. The memory module 164 may comprise RAM, ROM, flash memories, hard drives, or any non-transitory memory device capable of storing machine-readable instructions such that the machine-readable instructions can be accessed and executed by the processor 162. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 164. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 4 includes a single memory module 164, other embodiments may include more than one memory module.

The potentiometer 152 outputs a signal depending on a relative position of the wiper 154 of the finger 100 (See FIG. 2A) such that the relative position of the finger 100 can be determined.

The actuator drive hardware 166 includes one or more components, such as servo drive hardware, configured to actuate the finger 100 (e.g., to move the finger 100 relative to another finger (See FIG. 6) in order to grasp, pick up, or otherwise manipulate an object). It is noted that the actuator drive hardware 166 may also include associated software to control the various actuators of the robot.

The output signals from the first near range sensor 134a, the second near range sensor 134b, the third near range sensor 134c, and the long range sensor 136 may be used for a variety of purposes, such as to locate target objects, identify target objects, track target objects, or the like. In some embodiments, the memory module 164 includes machine readable instructions that, when executed by the processor 162, cause the robot to identify an object to be lifted manipulated, or grasped, to sense when an object is proximate to the finger 100, to detect surroundings of the finger 100, to determine whether an object can be lifted or grasped by the robot, or the like, based on one or more of the signals output by the first near range sensor 134a, the second near range sensor 134b, the third near range sensor 134c, and the long range sensor 136. In some embodiments, the robot may output such information, such as by providing an indication on a display screen, via tactile hardware, via a speaker, or the like, of the identity of an object, the location of an object, the fact that an object can be lifted or manipulated by the robot, or the like. By providing such sensors coupled to the finger 100 that move with the finger 100 and may move around and relative to objects as compared to cameras or other sensors positioned at a fixed location (e.g., positioned at a location to serve as "eyes" of the robot, or the like), object detection, object identification, and the like may be improved. Such sensors may also facilitate recognition of an object between fingers (e.g., when two opposing fingers 100 are coupled to a robotic arm for grasping and manipulating objects between the fingers), which may allow a robot to recognize an object positioned between the fingers and grab the object from a human handing the object to the robot without further input or prompt being provided to the robot.

Figure 5:
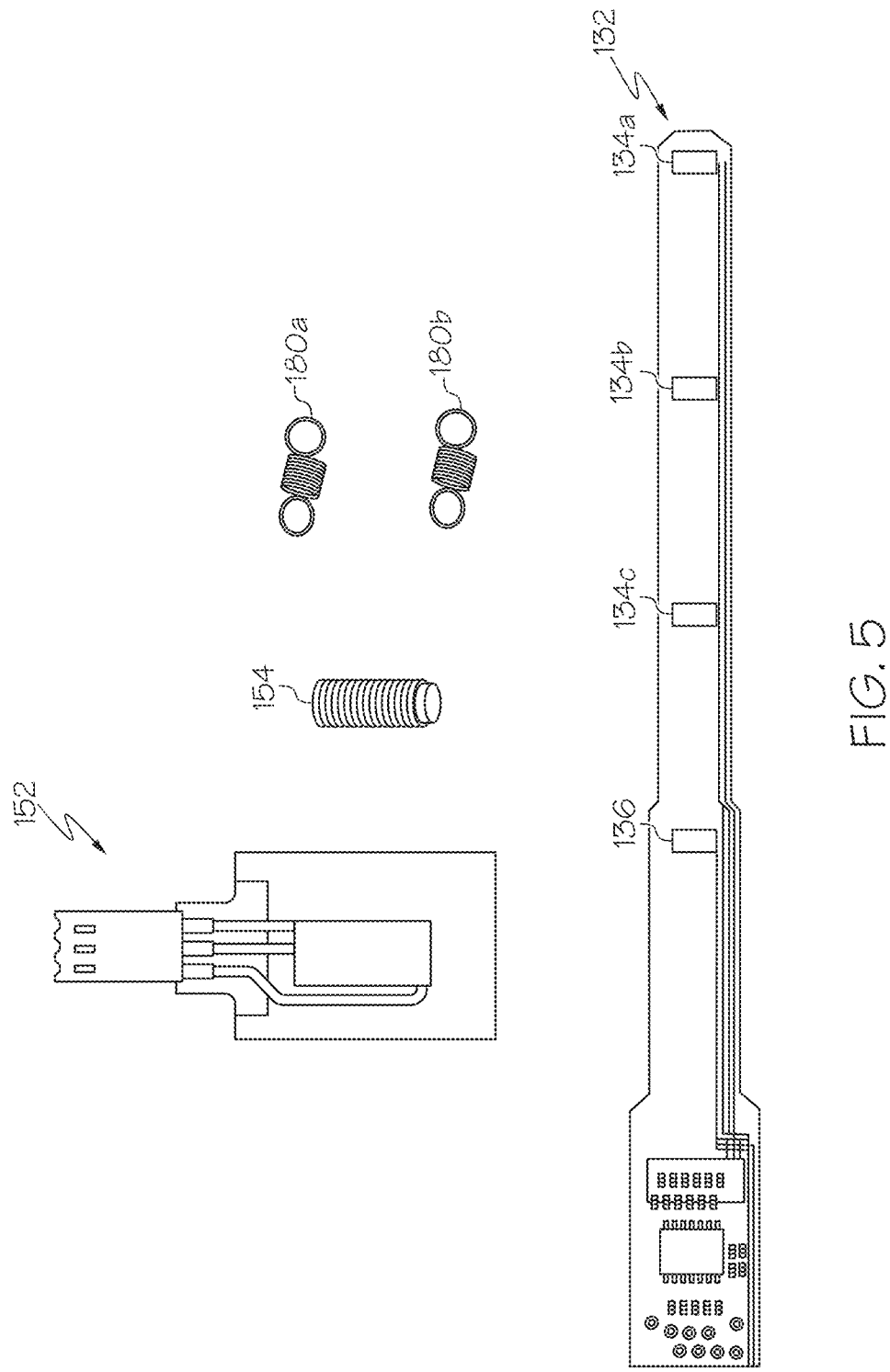
FIG. 5 depicts components of a robot according to one or more embodiments shown and described herein.

FIG. 5 depicts one example of the potentiometer 152, the wiper 154, the first spring 180a, the second spring 180b, the first near-range sensor 134a, the second near-range sensor 134b, the third near-range sensor 134c, and the long range sensor 136 coupled to the flexible printed circuit board 132.

FIG. 6 depicts the finger 100 installed as a component of a gripper assembly of a robotic Referring now to arm 500. The gripper assembly shown in FIG. 6 includes the finger 100 and an opposing finger 450. The opposing finger 450 may be a textured block, as shown in FIG. 6. Specifically, in one embodiment the opposing finger 450 may include one or more textured outer surfaces 502. In one embodiment, the opposing finger 450 may include a textured surface (not visible in FIG. 6) that opposes the object engagement face 110 of the finger 100. In other words, the gripper assembly includes a first finger defining a first object engagement face (e.g., the finger 100) and a second finger defining a second object engagement face (e.g. the opposing finger 450 and the textured surface that is not visible in FIG. 6), where the first object engagement face of the first finger opposes the second object engagement face of the second finger. At least one actuator is in communication with the first finger and is configured to actuate the first finger relative to the second finger, where the actuator may be part of the actuator drive hardware 166 shown in FIG. 4.

In some embodiments, the opposing finger may have the same construction as the finger 100 such that two opposing fingers 100 are installed on the robotic arm 500 and function together as the gripper assembly. That is, both the first finger and the second finger include similar construction. More specifically, the first finger and the second finger may both include respective near range sensors (e.g., the sensors 134a, 134b, 134c as seen in FIGS. 1A and 1B) as well as one or more far range sensors (e.g., the sensor 136 as seen in FIGS. 1A and 1B).

Referring to FIGS. 7A and 7B in conjunction with FIG. 4, the memory module 164 includes machine readable instructions that, when executed by the processor 162, cause the robot to determine a position of the finger 100 (e.g., relative to the finger retention bracket 170, relative to the robotic arm, or the like), and/or determine that the finger 100 has been pulled based on the signal output by the potentiometer 152 whose output varies based on the position of the slider (see FIG. 2C) relative to the potentiometer 152. For example, as shown in FIG. 7A, the robot may determine that the finger 100 is in a retracted position (e.g., in which the finger 100 is closer to the finger retention bracket 170 as compared to being in an extended position) based on the output of the potentiometer 152, while, as shown in FIG. 7B, the robot may determine that the finger 100 is in an extended position (e.g., in which the finger 100 is farther from the finger retention bracket 170 as compared to the retracted position) based on the output of the potentiometer 152 generated by the finger 100 being pulled away from the robotic arm.

The memory module 164 includes machine readable instructions that, when executed by the processor 162, cause the robot to determine that the finger 100 has been pulled based on the signal output by the potentiometer 152 and open up its gripper to drop or release an object in response to determining that the finger 100 has been pulled (e.g., by utilizing the actuator drive hardware 166 to move opposing fingers 100 installed at an end of a robotic arm in order to drop or release the object). That is, in response to determining the finger 100 is in the extended position, an object grasped between the finger 100 and another finger (e.g., the finger 450 shown in FIG. 6) is released. The output from the potentiometer 152 indicative of the position of the finger 100 may be used to trigger other actions of the robot (e.g., movement to a particular location, performance of a particular action, output of a tactile sensation, output of light, output of sound, or the like) and/or to provide input to the robot (e.g., input to perform a particular action, to power on or off, etc.).

FIG. 8A depicts an exploded view of a first finger 100a and FIG. 8B depicts an opposing second finger 100b. Referring to FIG. 8A, the first finger 100a includes a first body component 101a, a second body component 103a and is configured to be retained by a first finger retention bracket 170*a*. Referring to FIG. 8B, the second finger 100*b* includes a first body component 101*b* and a second body component 103*b* and is configured to be retained by the second finger retention bracket 170*b*.

Figure 8D:
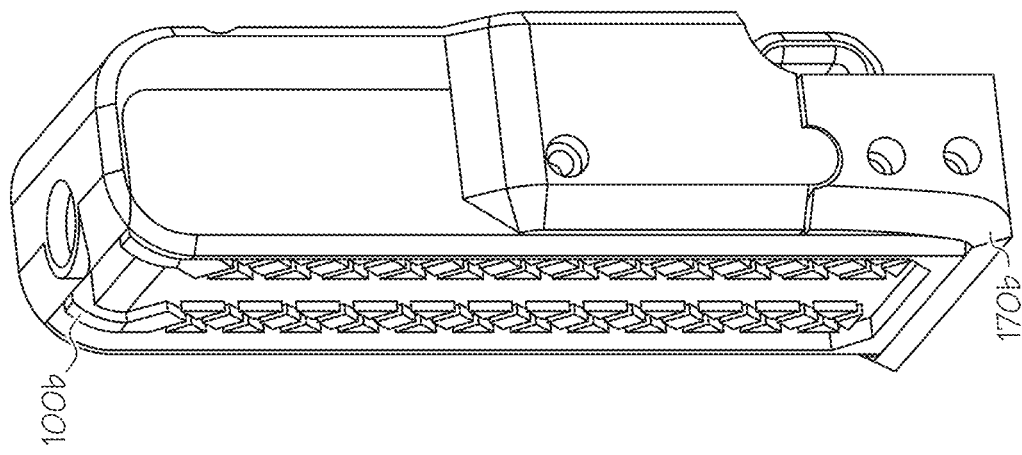
FIG. 8D depicts the finger shown in FIG. 8B assembled, according to one or more embodiments shown and described herein.
Figure 8C:
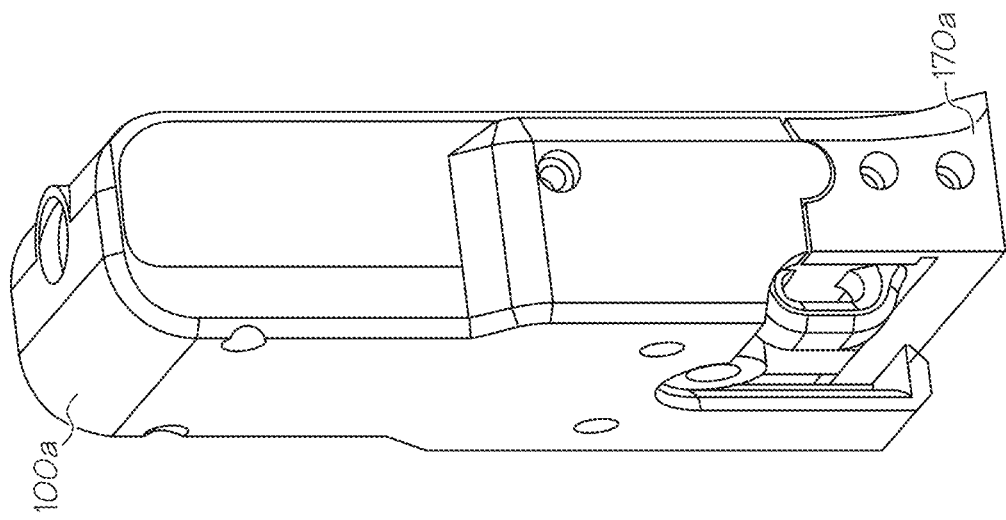
FIG. 8C depicts the finger shown in FIG. 8A assembled, according to one or more embodiments shown and described herein.
Figure 8E:
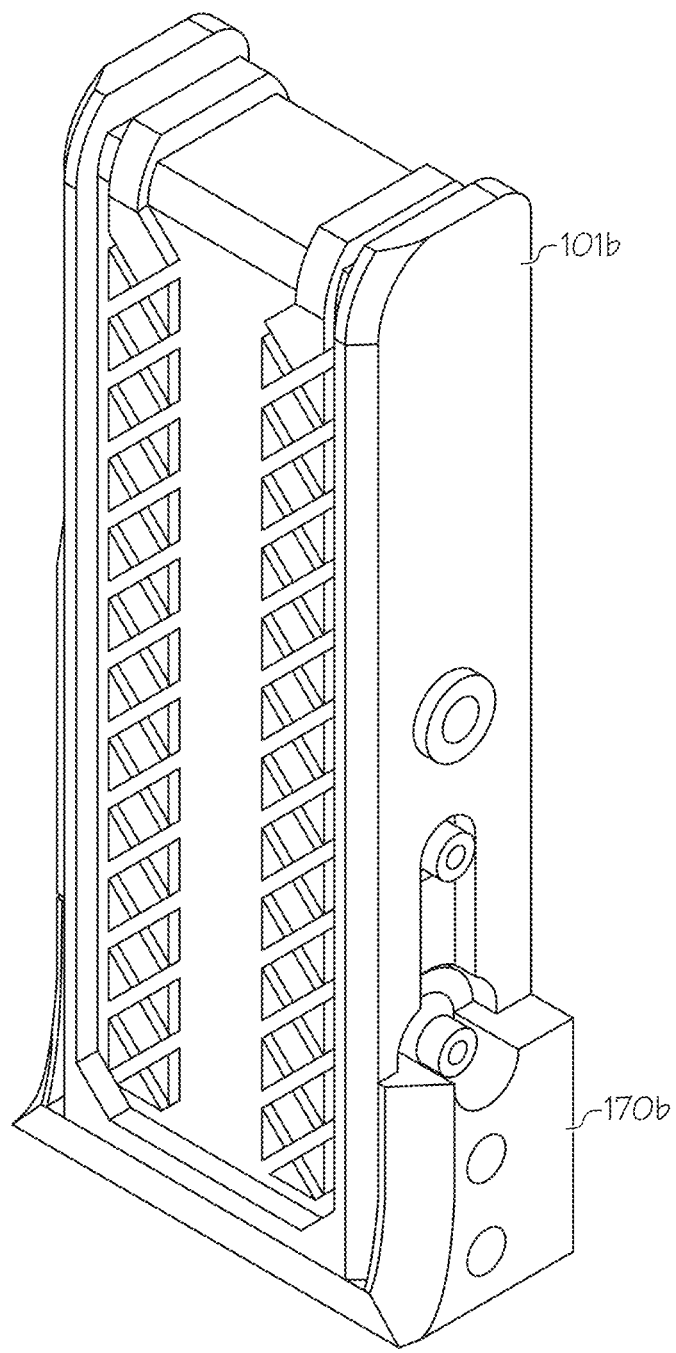
FIG. 8E depicts a perspective view of a portion of the finger shown in FIG. 8C in engagement with a finger engagement bracket, according to one or more embodiments shown and described herein.
Figure 8F:
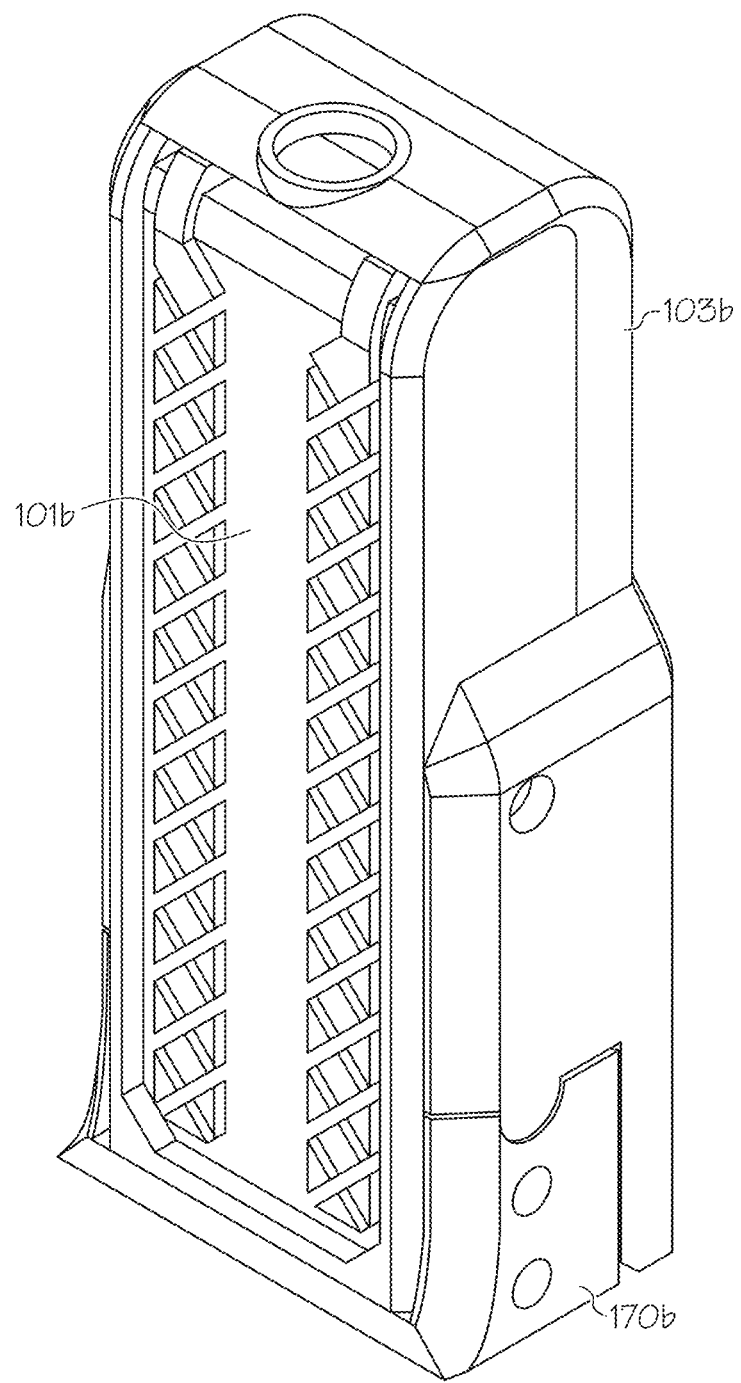
FIG. 8F depicts a perspective view of the finger shown in FIG. 8D in engagement with a finger engagement bracket, according to one or more embodiments shown and described herein.

FIG. 8C shows the first finger 100*a* including the first body component 101*a* and second body component 103*b* joined together. FIG. 8D shows the second finger 100*b* including the first body component 101*b* and the second body component 103*b* joined together. FIG. 8E depicts the first body component 101*b* of the second finger when coupled to the second finger retention bracket 170*b*. FIG. 8F depicts the joined first body component 101*b* and the second body component 103*b* when coupled to the second finger retention bracket 170*b*.

It should now be understood that the disclosed robotic gripper assembly includes at least one sensor that is configured to move in concert with one of the fingers of the assembly. The disclosed gripper assembly includes two fingers that oppose one another. At least one of the fingers of the gripper assembly includes either a near range sensor or a far range sensor configured to detect objects being grasped by the gripper assembly. More specifically, the sensor is disposed along an object engagement face of the respective finger. Therefore, the sensor may move together with the respective finger as the gripper is being operated, which in turn may enhance object detection, object recognition, and the like. In contrast, some conventional robotic gripper systems include cameras or other sensors positioned at a fixed location to view objects that are being grasped by the robotic fingers.

In one embodiment of the disclosed robotic gripper assembly, at least one of the fingers may be coupled to a retention bracket. The finger is moveable with respect to the retention bracket between an extended and a retracted position. In response to the robot determining that the finger has been pulled in a direction away from the retention bracket and into the extended position, the robot may instruct the gripper or other component to trigger a specific action. For example, in one embodiment the robot may instruct the gripper assembly to drop or release an object that is grasped between the two fingers.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A gripper assembly, comprising:
   a first finger defining a first object engagement face;
   at least one first sensor facing outward from the first object engagement face of the first finger, wherein the at least one first sensor is configured to detect objects to be manipulated by the first finger; and
   a covering material that is substantially transparent disposed over the at least one first sensor of the first finger, wherein the covering material defines two ridges and a cavity, and wherein the two ridges are positioned on opposite sides of the cavity and the at least one first sensor is disposed along the cavity.

2. The gripper assembly of claim 1, wherein the at least one first sensor comprises a plurality of first sensors facing outward from the first object engagement face of the first finger, wherein the plurality of first sensors are each near range sensors.

3. The gripper assembly of claim 2, wherein each of the plurality of first sensors are configured to detect the object at a same depth.

4. The gripper assembly of claim 2, wherein one of the plurality of first sensors is configured to detect the objects at a first depth and another of the plurality of first sensors is configured to detect the objects at a second depth, and wherein the first depth is either greater or less than the second depth.

5. The gripper assembly of claim 2, wherein the plurality of sensors are oriented to face either orthogonal to the first object engagement face or non-orthogonal to the first object engagement face of the first finger.

6. The gripper assembly of claim 1, wherein the first finger further comprises at least one long range sensor.

7. The gripper assembly of claim 6, wherein the first finger comprises a proximal end and a distal end, and wherein the at least one long range sensor is disposed at the distal end of the first finger.

8. The gripper assembly of claim 1, wherein the first finger further comprises:
   a retention bracket;
   at least one biasing member coupled to the first finger and the retention bracket, wherein the first finger is biased to be in engagement with the retention bracket and is moveable in a direction away from the retention bracket when the first finger is pulled in the direction away from the retention bracket; and
   a sensor configured to output a signal indicative of a position of the first finger relative to the retention bracket.

9. The gripper assembly of claim 8, further comprising:
   one or more processors; and
   one or more non-transitory memory modules communicatively coupled to the sensor and the one or more processors and storing machine-readable instructions that, when executed, cause the one or more processors to perform at least the following:
   monitor the signal generated by the sensor; and
   determine the first finger is pulled in the direction away from the retention bracket based on the signal generated by the sensor, wherein the first finger is in an extended position when being pulled.

10. The gripper assembly of claim 9, further comprising a second finger, wherein the first finger is moveable relative to the second finger to grasp an object, and wherein the machine-readable instructions further cause the one or more processors to:
    in response to determining the first finger is in the extended position, release the object grasped between the first finger and the second finger.

11. The gripper assembly of claim 8, wherein the at least one biasing element comprises a spring that couples the first finger to the retention bracket such that a base of the first finger is biased into engagement with the retention bracket by the spring.

12. The gripper assembly of claim 8, wherein the first finger defines an object engagement face configured to face toward an object to be engaged by the first finger.

13. The gripper assembly of claim 12, further comprising at least one near range sensor facing outward from the first object engagement face, wherein the at least one near range sensor is configured to detect the objects to be engaged by the first finger.

14. The gripper assembly of claim 8, wherein the first finger further comprises at least one long range sensor.

15. The gripper assembly of claim 1, further comprising:
a second finger defining a second object engagement face, wherein the first object engagement face of the first finger opposes the second object engagement face of the second finger; and
at least one actuator in communication with the first finger, wherein the actuator is configured to actuate the first finger relative to the second finger.

16. The gripper assembly of claim 15, further comprising at least one second sensor facing outward from the second object engagement face of the second finger, and wherein the at least one second sensor is configured to detect objects to be manipulated by actuating the first finger relative to the second finger.

17. The gripper assembly of claim 16, wherein the at least one first sensor and the at least one second sensor are both near range sensors.

18. The gripper assembly of claim 15, wherein the second finger is a block that defines a textured outer surface.

* * * * *